United States Patent [19]

Binder

[11] 4,169,304
[45] Oct. 2, 1979

[54] METHOD OF MAKING A BUILDING COLUMN

[76] Inventor: Burton A. Binder, 3093 Moon Lake Rd., West Bloomfield, Mich. 48033

[21] Appl. No.: 878,419

[22] Filed: Feb. 16, 1978

Related U.S. Application Data

[63] Continuation-in-part of Ser. No. 726,825, Sep. 27, 1976, abandoned.

[51] Int. Cl.² .............................................. B23P 17/00
[52] U.S. Cl. .................................. 29/155 C; 29/527.1; 264/46.6; 264/46.7
[58] Field of Search .............. 29/155 C, 155 R, 527.1; 156/79; 264/46.6, 46.7; 52/727

[56] References Cited

U.S. PATENT DOCUMENTS

| | | | |
|---|---|---|---|
| 1,876,166 | 9/1932 | Randall | 264/46.7 |
| 2,976,577 | 3/1961 | Gould | 264/46.6 |
| 3,301,927 | 1/1967 | Exley et al. | 264/46.6 |
| 3,566,000 | 2/1971 | Maurer et al. | 52/727 |
| 3,634,565 | 1/1972 | Schaerer | 264/46.7 |

FOREIGN PATENT DOCUMENTS

765814  10/1971  Belgium ................................ 264/46.6

*Primary Examiner*—Lowell A. Larson
*Attorney, Agent, or Firm*—Cullen, Sloman, Cantor, Grauer, Scott & Rutherford

[57] ABSTRACT

One or more thin metal sheets are formed as a hollow shell having a longitudinal load-bearing axis. The thin-walled hollow shell is filled with a core of a plastic foaming material including a suitable foaming agent which foams to fill the shell and to exert a force on the shell radially outwardly of the longitudinal axis thereby forming a solid composite column. The radially outward force deflects the shell and permanently places the shell in lateral tension to increase the load bearing capability of the column. When more than one sheet is used, the elongated edge portions of the sheets are configured to loosely interfit with one another when the shell is initially formed, and the plastic foaming material causes a positive locking of the interfitted edge portions. Thus thin, non-load bearing gauge aluminum is converted into a load bearing structural element.

5 Claims, 11 Drawing Figures

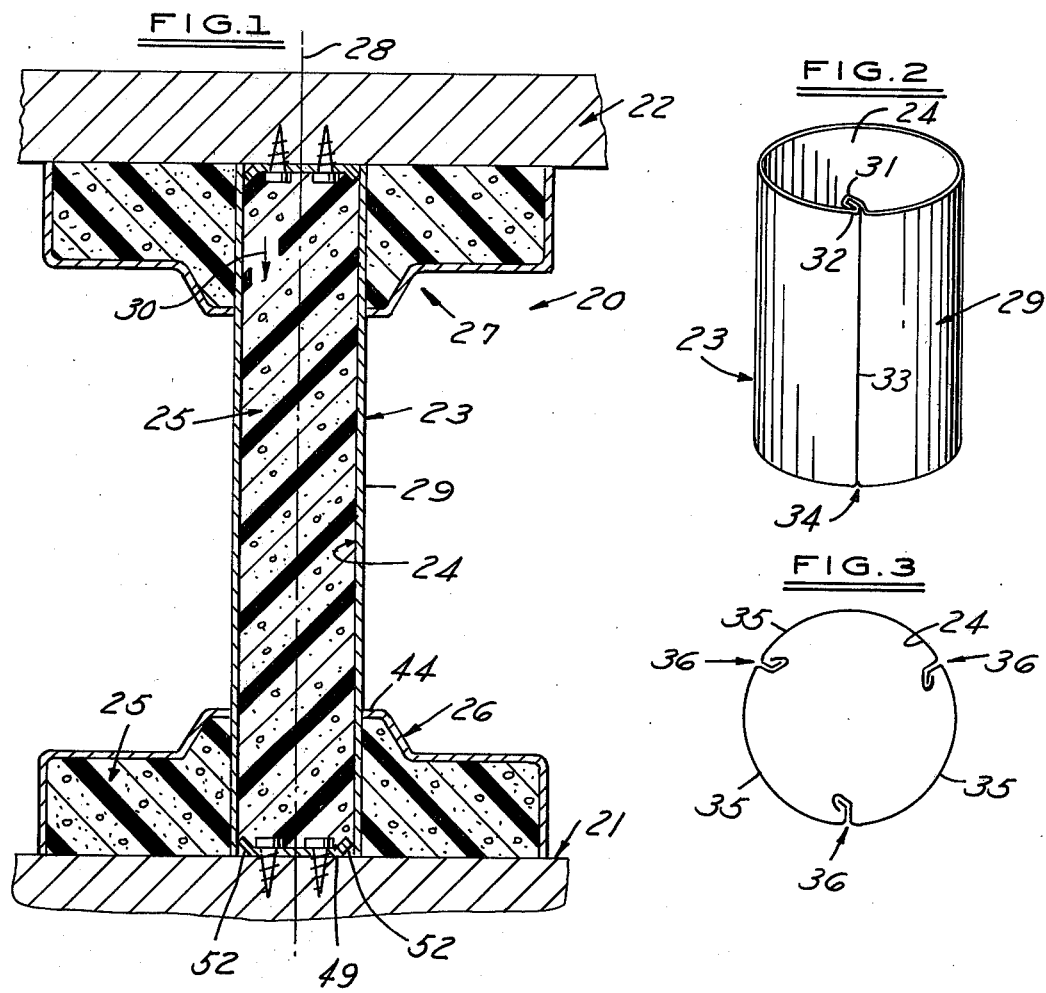
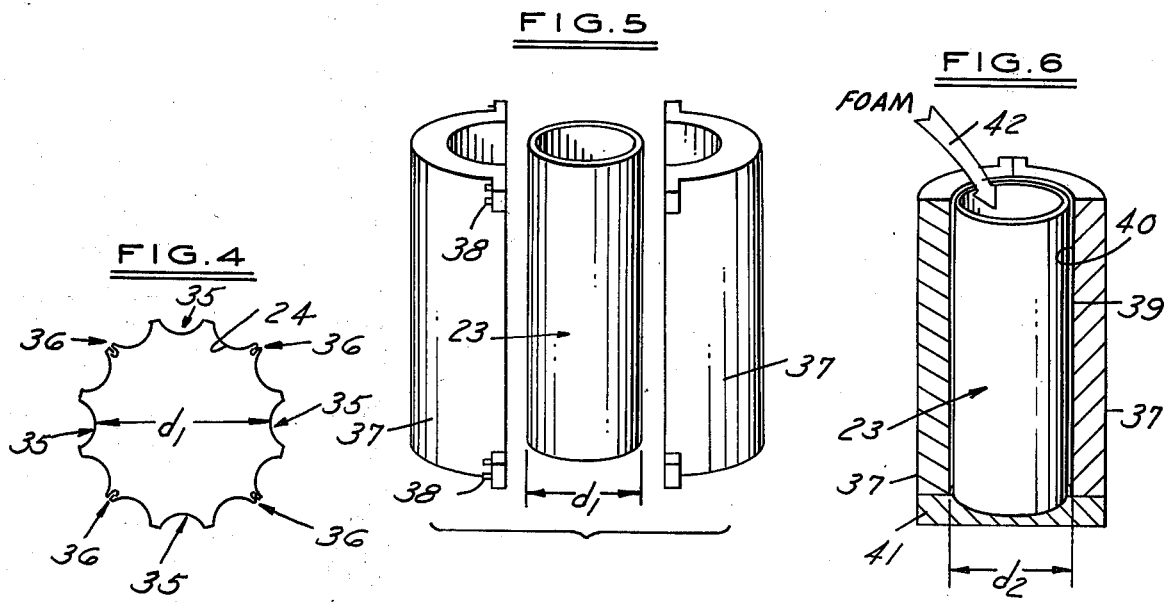

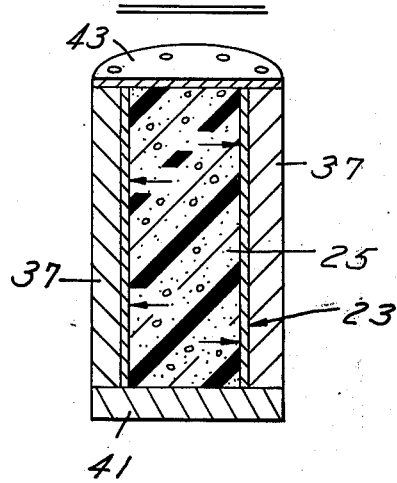
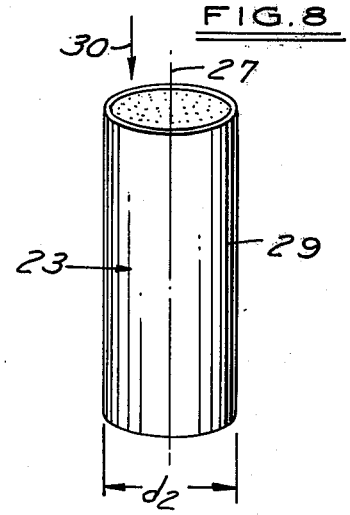
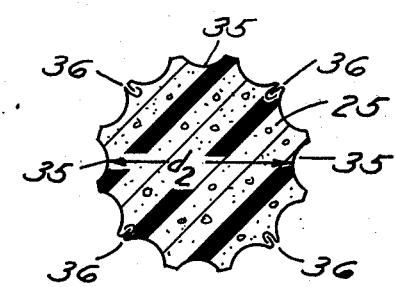
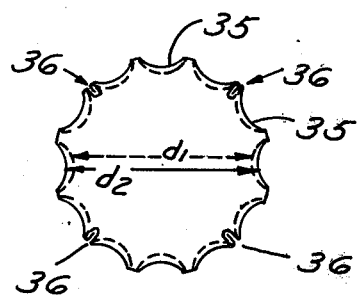
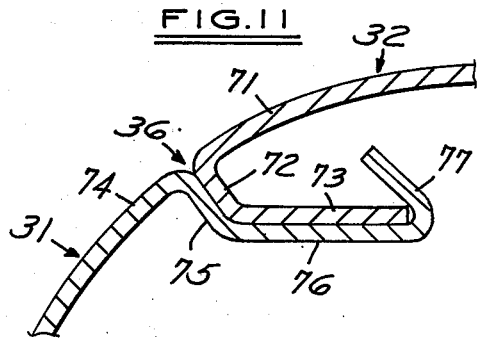

METHOD OF MAKING A BUILDING COLUMN

CROSS-REFERENCE TO RELATED APPLICATIONS

This is a continuation-in-part of my co-pending application Ser. No. 726,825, filed Sept. 27, 1976 now abandoned.

BACKGROUND OF THE INVENTION

The present invention relates generally to composite building columns and, more particularly, to an improved method of making a low cost, light weight, composite building column which is both decorative and able to withstand substantial compression loads along its longitudinal axis.

Most of the building columns of the prior art are relatively heavy solid structures which serve both supportive and decorative functions. In order to be able to withstand compression loads such as may be encountered in supporting a porch or the like, the columns are generally made from solid wood, solid concrete, or some type of reinforced solid structure. These structures are expensive and difficult to make and they are hard to handle and erect due to their great weight.

Recently, a relatively lightweight decorative building column has been formed from extruded aluminum which can be formed into a hollow column having relatively thick side walls at least 0.060 inches thick which support the compression loads along the longitudinal axis of the column. While these columns represent a significant advance over the prior art, they are still expensive due to the amount of the aluminum required for the thick walls and due to the high cost of the extrusion process. The weight, although reduced, is still considerable rendering such columns difficult to transport, handle and erect. Workmen are required to assemble such columns at the job site. Such columns are not solid so they rattle and sound flimsy and hollow when struck.

While such attempts represent a significant advance over the prior art, the need still exists for a low cost, lightweight, decorative building column wherein the thickness of the material defining the column is greatly reduced so as to minimize the cost yet wherein the strength of the column and its ability to withstand compression loads along its longitudinal axis is increased or at least maintained without increasing the cost or weight of the column. A need continues to exist for a low cost, lightweight column which can be easily made, transported, handled and erected with a minimum of time and effort.

The method of the present invention overcomes all of the disadvantges of the prior art set forth hereinabove and provides a lightweight, low cost decorative building column which is able to withstand compression loads along its longitudinal axis and which can be easily made, transported, handled and erected with a minimum of time and effort.

SUMMARY OF THE INVENTION

The present method of forming a building column starts with aluminum of a thin, non-load bearing gauge, and forms the aluminum into a load bearing, structural element.

More specifically, the method of forming the building column of the present invention so as to enable the column to withstand substantial compression loads along its longitudinal axis without buckling of the side walls, includes the steps of assembling a thin-walled hollow shell having a longitudinal axis and a cross-sectional configuration of a first dimension. The step of assembling the hollow shell may include providing relatively thin sheets of lightweight material such as aluminum with edge portions configured to loosely interfit with one another when the shell is initially formed. The hollow shell is then filled with a plastic foaming material including a foaming agent and the plastic material foams to laterally expand the sides of the shell so that its cross-sectional configuration assumes a diameter slightly greater than the first dimension. This lateral or radially outward expansion deflects the shell and permanently places the shell in lateral tension to increase the load bearing capability of the shell and further causes the edge portions of the sheets to positively interlock along a longitudinal seam.

As the foaming material cures, it adheres to the inside walls of the shell and strengthens the laterally expanded shell so as to enable the composite column to withstand compression loads along the longitudinal axis without buckling the thin walls of the shell and without crushing or crumbling the foaming material. Non-adhering foam may also be used although foaming material which adheres as it cures is preferred.

In the preferred embodiment of the present method, the hollow shell may be enclosed within an elongated hollow form having a configuration similar to and dimensioned slightly greater than the first cross-sectional dimension such that when the shell is filled with the plastic foaming material and allowed to expand, the greater or expanded dimension of the filled shell is limited by the interior configuration of the hollow form. The expanded, foam-filled composite column may then be removed from the form prior to use. In those applications where the expanded dimension and its uniformity are not critical, the elongated hollow form may be omitted and the shell expanded without the use of a form.

BRIEF DESCRIPTION OF THE DRAWINGS

The various objects and advantages of the present invention will be more fully understood upon reading the following detailed description of the invention taken in conjunction with the drawings. In the drawings, wherein like reference numerals identify corresponding components:

FIG. 1 is a fragmentary, front sectional view of a foam-filled thin metal shell forming a building column of the present invention positioned for illustrative purposes between a porch roof and a ground plane surface;

FIG. 2 is a fragmentary, perspective view of a thin-walled hollow shell formed from a single sheet of relatively thin lightweight material having one edge portion secured to another along a longitudinal seam;

FIG. 3 is a top plan view of another embodiment of the thin-walled-hollow shell of FIG. 2 wherein three thin metal sheets are adapted to be loosely interfitted together to form the desired configuration of the shell;

FIG. 4 is a top plan view of a preferred embodiment of the thin-walled hollow column of FIG. 2 wherein each of the thin metal sheets are of fluted design;

FIG. 5 is an exploded, partially sectional view representing the step in which the assembled, thin-walled hollow shell is enclosed within a form;

FIG. 6 is a sectional view representing the thin-walled shell enclosed within the elongated form as it is filled with the plastic foaming material including the foaming agent;

FIG. 7 is a sectional view illustrating the enclosed column of FIG. 6 after it has been filled with the plastic foaming material and allowed to expand to its maximum lateral extent;

FIG. 8 is a perspective view of the expanded foam-filled column of the present invention after it has been removed from the elongated hollow form of FIG. 7;

FIG. 9 is a sectional view looking in the direction of the longitudinal axis of a thin-walled fluted shell of FIG. 4 which has been filled with a plastic foaming material and allowed to expand laterally to put the thin walls in lateral tension;

FIG. 10 is a diagrammatic illustration of the fluted thin-wall shell illustrating in solid lines the lateral expanded configuration and in dotted lines the initial configuration of the shell; and FIG. 11 is a top plan view of a portion of the shell shown on an enlarged scale illustrating the interlocking edge portion configurations of the individual metal sheets.

DESCRIPTION OF THE PREFERRED EMBODIMENT

FIG. 1 shows the building column assembly 20 of the present invention as it is operatively positioned between a relatively flat ground plane or support surface 21 and a porch-like roof or overhang 22. The building column assembly 20 includes a thin-walled hollow shell 23 which has its hollow interior 24 filled with a core such as a plastic foaming material 25. The term plastic foaming material as it is used herein, includes both the plastic foam, or foaming material itself and the foaming agent required to bring about the foaming action, and any suitable, conventionally known foaming material may be used. The column assembly 20 may further include a substantially hollow, thin-walled, socket-type assembly or base portion 26 and a corresponding substantially hollow, thin-walled, upper socket-type assembly 27. The column assembly 20 disclosed in FIG. 1 has a generally cylindrical cross-sectional configuration and a substantially vertical longitudinal axis 28.

As illustrated in FIGS. 1 and 2, the walls 29 of the thin-walled hollow shell 23 are relatively thin and the interior portion 24 of the shell 23 is hollow, as indicated in FIG. 2, prior to its being filled with the plastic foaming material 25. FIG. 2 shows a thin-walled hollow shell 23 which is formed from a single sheet of lightweight material such as aluminum or the like having good weatherability. Preferably thin gauge aluminum, of the thickness used in aluminum siding, (e.g. around 0.019 inch) is preferred. A first edge portion 31 of the sheet or wall portion 29 is shaped or configured so as to loosely interfit with a second correspondingly configured edge portion 32 so as to form a generally continuous shell 23 having a substantially cylindrical columnular configuration. The edge portions 31, 32 may be retainably secured to one another via brazing or some conventionally known fastening means 33 along a longitudinal seam 34 either before or after expansion but, in the preferred embodiment disclosed herein, the lateral expansion of the shell will cause the edge portions 31, 32 to automatically interlock with one another to form a continuous, permanent, watertight longitudinal seam 34 which does not require fastening means or brazing or crimping.

FIG. 3 represents an alternate embodiment of the generally cylindrical thin-walled hollow shell 23 of FIG. 2, with three relatively thin sheet-like segments 35 each having end portions 36 which are adapted to be loosely interfitted to one another to form the generally cylindrical, thin-walled, hollow shell 23 of FIG. 2.

FIG. 4 illustrates a preferred construction wherein the external surface of the walls of the shell 23 contain a plurality of longitudinally aligned fluted formations.

From the above description of FIGS. 2, 3, and 4, it will be obvious in any number of segments 35 may be employed to achieve the desired configuration of shell 23 and that any suitable type of fastening means and/or configuration of end portions 36 can be used in light of these teachings. Regardless of which of the methods are used to assemble the thin-walled, hollow shell 23 and regardless of the desired cross-sectional configuration, the shell 23 can be filled with a plastic foaming material 25 which expands laterally in a direction generally perpendicular to and radially outwardly from the longitudinal axis 28 so as to slightly expand the cross-sectional dimension or configuration of the shell 23 and permanently place the shell in lateral tension. This expansion also causes the loosely interfitting edge portions 36 to permanently interlock along longitudinal seams 34 and the curing of the foaming material 25 causes it to positively adhere to the interior of the walls 29 or the segments 35 and rigidify so as to strengthen the shell 23 and allow it to sustain compression loads, represented by the arrow 30 in FIG. 1, in a direction along the longitudinal axis 28 without buckling the thin outer walls 29.

The method of the present invention will be described with reference to FIGS. 2 through 8. FIGS. 2-4 represent the step of assembling the thin-walled hollow shell 23 having a longitudinal axis 28 and a cross-sectional dimension "$d_1$" from a relatively thin sheet of lightweight material such as aluminum or the like. These figures also represent the step of forming the edge portions 31, 32 of the sheet 28 or the edge portions 36 of the segments 35 into predetermined configurations adapted to allow the end portions to be loosely interfitted to one another for forming the hollow shell 23 in the desired column configuration.

FIG. 5 represents the optional step of enclosing the formed hollow shell 23 within an elongated hollow forming structure or form 37 which has a similar cross-sectional configuration and an inside configuration or diameter "$d_2$" which is slightly greater than the initial diameter "$d_1$" of the hollow shell 23. The elongated hollow forming structure 37 completely encircles the hollow shell 23 and the forming structure 37 may be secured in the closed position by conventional fastening means 38.

FIG. 6 represents the step of filling the hollow shell 23 with the foaming material 25. The hollow shell 23 having a first cross-sectional configuration or diameter "$d_1$" is shown with a slight air space 39 immediately surrounding the hollow shell 23 to allow for lateral expansion. The outer limit of lateral expansion is determined by the interior surface 40 of the form 37 so as to positively limit the lateral expansion to the maximum internal diameter "$d_2$" of the closed forming structure 37. The bottom of the hollow shell 23 is closed by the solid base portion 41 of the forming structure 37 and the plastic foaming material 25 is fed or introduced into the hollow shell 23 as indicated by the arrow designated 42.

In a preferred embodiment urethane having a density in the range of 1.5 to 2.0 pounds per cubic foot is used as the core or foaming material 25. Sufficient foam should be used, based on the length of the column so that the lateral expansion is in the range of ¼" to ½" for a 12 inch diameter column. Thus $d_2$ should exceed $d_1$ by about 2 to 4 percent. This provides the necessary lateral outward tension on the shell for the desired strength without rupturing the shell.

The introduction of the plastic foaming material 25 which is represented by the arrow 42 contemplates either the simultaneous introduction of both the plastic foaming material and a suitable foaming agent or separate introduction, as desired. Once the appropriate materials are introduced or activated, the plastic foaming material 25 will expand laterally outward in a direction generally normal to the longitudinal axis 28 until the cross-sectional dimension of the shell 23 has been expanded from the initial dimension "$d_1$" to the slightly greater dimension "$d_2$" as indicated in FIGS. 7 and 8. FIG. 7 indicates that the top portion of the shell 23 may be closed by a top or cap 43 of the forming structure 37 once the plastic foaming material 25 has been introduced, and the cap 43 can be provided with conventionally known safety valve means, not shown, if such were required. As an alternate, the expanded dimension "$d_2$" may be attained without the use of the hollow forming structure 37 if strict accuracy of the dimension "$d_2$" is not required.

After a predetermined amount of expansion and curing of the plastic foaming material 25 has taken place, the hollow forming structure 37 may be removed and the foam-filled, dimensionally-expanded, edge-interlocked, rigidified column may be removed as indicated in FIG. 8. The foam-filled column of FIG. 8, with the shell in tension, is able to withstand compression loads along the longitudinal axis 28 without the thin walls 29 buckling due to the lateral expansion of both the plastic foaming material 25 and the shell being in tension. The expanded and cured foaming material 25 adheres permanently to the interior walls of the sides 29 and hardens to reinforce shell 23 to increase its load-bearing capability with a minimal thickness of sheet-like material thereby minimizing the cost while insuring an extremely lightweight column which is easy to manufacture, easy to transport, easy to handle, and easy to install by a minimum of workmen.

As previously explained, the preferred embodiment of the present invention contemplates the use of a shell which is longitudinally fluted, whether it be made as a single sheet or a plurality of sheets. This preferred configuration of the shell is illustrated in FIG. 4 where the shell, as formed, has an internal diameter (between opposed fluted portions) identified as "$d_1$". When a fluted shell of this configuration is filled with the foam core 25, whether or not a form is utilized as in FIGS. 5, 6 and 7, the completed column is illustrated in cross-section in FIG. 9.

As heretofore explained, the lateral expansion of the foam core 25 causes a lateral expansion of the fluted walls of the shell and places these walls in lateral outward tension. Thus the diameter between opposed fluted portions has been increased to a dimension "$d_2$" which is greater than "$d_1$". The relationship of this expansion and permanent tension is illustrated diagrammatically in FIG. 10 wherein the initial configuration of the shell and its initial diameter are illustrated in dotted lines and whereas the final configuration of the shell is illustrated in solid lines with a diameter "$d_2$". For the purpose of clarity of illustration, the foam core 25 has been eliminated from FIG. 10.

Once the column has been completely formed, it may be cut to the desired length with a conventional carpenter saw. Thereafter, it may be installed between a ground plane 21 and an upper overhang 22 as illustrated generally in FIG. 1. The details of such an installation do not form a part of the method of the instant invention but are hereafter described for the sake of completeness.

The base assembly 26 is formed from a single sheet of relatively thin lightweight material such as aluminum or the like. The base assembly 26 has an upper surface 44 which is generally annular so as to surround a punched out central aperture extending therethrough. When this central aperture is punched out, it may thereafter be utilized as a fastening member 49 by rigidly anchoring the circular portion or disc 49 to the ground plane 21 by screws or other conventional fastening or anchoring means. The disc or circular portion 49, in the preferred method of installation, is precisely located on the ground plane 21 so that the lower end of the column 23 may fit around the circular disc 49. In this way the up-turned edges 52 of the member 49 are frictionally received within the interior of the end of the column. With this arrangement, the column 23 and the base assembly 26 may be, in a preferred embodiment, securely fastened solely by friction fit. In this fashion the column 23 is retainably positioned with respect to the ground plane 21 by means of the circular or disc shaped member 49 while the base assembly 26 is secured about the lower end of the column 23 via the edge portions of the aperture in the upper surface 44 of the base assembly.

In the preferred embodiment, the socket-type base assembly 26 is formed at a factory and is also filled with a foam 25 substantially the same as the foam core of the building column.

Alternatively, a non-foamed hollow base assembly 26 may be placed in the proper position with respect to the ground plane 21 prior to the insertion of the lower end of the column 23 through the aperture in the top 44 of the base. Then the lower end of the column is inserted through the aperture until its distal end abuts the ground plane or surface 21 and the hollow interior portion within the base assembly 26 may then be filled with a plastic forming material 25 as previously described. Since the preferred plastic forming material is a urethane, it will adhere to the exterior of the column below the top 44 of the socket assembly.

FIG. 11 shows an enlarged view of the interlocking edge configurations 36 used to connect the sheet-like segments or wall sections 35 together to form the shell 23 of the present invention. The outer edge portion 32 includes a first portion 71 which serves as a portion of the outer wall 29 of the shell 23, a second, inwardly angled portion 72 which forms an acute angle with the first portion 71, and a third relatively straight portion 73 which forms an obtuse angle with the second portion 72 so that the first, second and third portions 71, 72, and 73, respectively, form a generally U-shaped, inwardly-turned lip. The inner edge portion 31 includes a first portion 74 which serves as a portion of the outer wall 29 of the shell 23 and a second inwardly angled portion 75 adapted to be disposed flush against the portion 72 and which forms an acute angle with the first portion 74. The edge portion 31 further includes a third relatively straight portion 76 which forms an obtuse angle with the portion 75 and which is adapted to be disposed flush against the corresponding third portion 73 of the outer edge portion 32. Lastly, the inner edge portion includes a fourth portion 77 which forms an acute angle with said third portion 76 and which is disposed outwardly therefrom so that the portions 75, 76, 77 form a hook for operatively engaging the lip in a loosely interfitting manner. Upon lateral expansion of the walls 29 of the shell 23, the edge portions 31, 32 (generally designated 36) will self-lock to form the desired columnular configuration. The fluted portions of the sheets, as well as the edge configurations, may be produced by a roll forming operating.

THE SYNERGISTIC RESULTS

Several synergistic results are obtained from the present method.

First, the load-bearing capacity of the column exceeds the sum of the individual load-bearing capacities of the shell and of the core. It is believed that this is a result of placing the skin in a permanent laterally outward tension. It should be noted that thin aluminum siding is thus made into a load-bearing structural element.

Second, it is possible to cut the finished column to a precise length at the time that the column is installed to support a porch or the like, by using a conventional carpenter's saw.

Third, when the column is to be positioned against a wall, a conventional rip saw may be used to longitudinally cut the column in half. The half-column may be placed flat against the wall and secured thereto either by fasteners or glue.

Fourth, the column, when struck laterally with a hammer or the like, sounds like a solid wood column—it does not sound like thin metal nor does it sound as though there is a foam core.

Fifth, the skin may be painted before roll forming, filling and cutting. The paint is not damaged by the subsequent operations nor does the paint chip or crack from the lateral expansion of the skin being placed in tension.

TEST RESULTS

To properly evaluate benefits of the present method, various tests have been made utilizing columns having a round cross-section. The columns are made having a shell of non-load-bearing aluminum having a thickness of 0.019 inches with a core material of foamed urethane. In each instance the diameter of the column was twelve inches. The shells were initially painted with a vinyl paint having a reflectivity in the range of 65%–80% and compatible with urethane.

The first two columns had a sixteen foot length and each column supported over 7000 pounds. The second two columns had an eight foot length with the first of such columns supporting 5500 pounds and the second of such columns supporting 8000 pounds. At these loads the paint did not appear to crack or chip.

In the preferred embodiment disclosed herein, the plastic core generally designated by the reference numeral 25 is a low density rigid urethane such as styrofoam or any expanding cellular high porosity plastic material. It will be recognized that a suitable core materials may be used providing that the foaming material produces the desired lateral expansion to place the shell in lateral tension. Heat may be added to initiate or sustain the foaming reaction and/or to facilitate curing.

With this detailed description of the present method, it will be obvious to those of ordinary skill in the art that other modifications can be made without departing from the spirit and scope of the present invention.

I claim:

1. A method of forming a decorative building column to withstand substantial compression loads along the longitudinal axis of the column without buckling comprising the steps of:

assembling a thin-walled hollow non-load-bearing shell having a longitudinal axis and a cross-sectional configuration of a first dimension from at least one sheet of relatively thin lightweight metal such that the edge portions of said sheet loosely interfit with one another when said assembly is complete;

filling said loosely assembled thin wall hollow shell with a foamable plastic material; and expanding said foamable plastic material within said shell to laterally expand said cross-sectional configuration of said thin-walled hollow shell to a second dimension slightly greater than said first dimension to place said shell in laterally outward tension, said second dimension being greater than said first dimension by about two-four percent, the expanding of said plastic positively locking the edge portions of said sheet along a longitudinal seam and the foamable plastic material adhering to the interior walls of said shell;

whereby said column including the shell and the foamable plastic withstand compression loads along said longitudinal axis without buckling said shell and without crumbling said plastic.

2. The invention as defined in claim 1 wherein said assembled shell is enclosed with an elongated hollow forming structure prior to said step of filling said shell with a foamable plastic material for providing a maximum outer limit of lateral expansion and a maximum limit of outward lateral tension on said shell; and the additional step of removing said column from said elongated hollow forming structure after said expansion is complete.

3. The invention as defined in claim 1 and further including the preliminary step of painting said shell prior to said step of assembling;

whereby said paint is not marred, chipped or cracked by the lateral expansion of said shell or the placing of said shell in lateral outward tension.

4. The invention as defined in claim 1 wherein said step of assembling includes assembling at least two sheets together to form said longitudinal shell.

5. The invention as defined in claim 1 wherein said step of assembling includes interfitting at least two elongated fluted members to form said shell.

* * * * *